United States Patent
Duke et al.

(10) Patent No.: US 6,929,749 B2
(45) Date of Patent: *Aug. 16, 2005

(54) COOLING WATER SCALE AND CORROSION INHIBITION

(75) Inventors: Dan A. Duke, Temecula, CA (US); John L. Kubis, Mission Viejo, CA (US); John P. Wetherell, Crestone, CO (US)

(73) Assignee: Water & Enviro Tech Company, Inc., Mission Viejo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/754,797

(22) Filed: Jan. 9, 2004

(65) Prior Publication Data

US 2005/0150834 A1    Jul. 14, 2005

(51) Int. Cl.⁷ ............................................. C02F 5/00
(52) U.S. Cl. ....................... 210/652; 210/687; 210/696; 159/47.1; 203/10
(58) Field of Search ............................ 159/47.1, 47.3; 203/10; 210/696–701, 743, 746, 96.1, 652, 210/687, 702, 748; 422/13

(56) References Cited

U.S. PATENT DOCUMENTS

| | | | |
|---|---|---|---|
| 5,277,823 A | | 1/1994 | Hann et al. |
| 5,403,521 A | * | 4/1995 | Takahashi .................... 261/26 |
| 6,315,909 B1 | * | 11/2001 | Hoots et al. ................. 210/745 |
| 6,334,955 B1 | * | 1/2002 | Kawashima et al. ........ 210/636 |
| 6,402,957 B1 | * | 6/2002 | Boyce ......................... 210/652 |
| 6,468,470 B1 | * | 10/2002 | Oldsberg et al. .............. 422/15 |
| 6,537,456 B2 | * | 3/2003 | Mukhopadhyay ........... 210/652 |
| 6,733,636 B1 | * | 5/2004 | Heins ............................ 203/1 |

OTHER PUBLICATIONS

Strumm, et al.; "Formation of Polysilicates as Determined by Coagulation Effects"; Environmental Science and Technology; 1967; Vo. 1, 21-227.

Rozenfield, I.L.; "Corrosion Inhibitors"; 1981; McGraw Hill; 171-174.

The NALCO Water Handbook; 1979; Chapter 3, p. 14 and 16.

Drew; Principles of Industrial Water Treatment; Sixth Edition; 1983; Chapter 3, pp. 43 and 64.

Boffardi, Bennett P., PhD; Calgon Internal Publication; 1988; Chapter 4; pp. 30-31.

* cited by examiner

*Primary Examiner*—Peter A. Hruskoci
(74) *Attorney, Agent, or Firm*—Stetina Brunda Garred & Brucker

(57) ABSTRACT

A methods of the present invention for inhibiting silica scale formation and corrosion in aqueous systems where soluble silica residuals ($SiO_2$) are maintained in excess of 200 mg/L, and source water silica deposition is inhibited with silica accumulations as high as 4000 mg/L (cycled accumulation) from evaporation and concentration of source water. The methods of the present invention also provides inhibition of corrosion for carbon steel at corrosion rates of less than 0.3 mpy (mils per year), and less than 0.1 mpy for copper, copper alloy, and stainless steel alloys in highly concentrated (high dissolved solids) waters. The methods of the present invention comprise pretreatment removal of hardness ions from the makeup source water, maintenance of electrical conductivity, and elevating the pH level of the aqueous environment. Thereafter, specified water chemistry residual ranges are maintained in the aqueous system to achieve inhibition of scale and corrosion.

15 Claims, No Drawings

COOLING WATER SCALE AND CORROSION INHIBITION

CROSS-REFERENCE TO RELATED APPLICATIONS

Not Applicable

STATEMENT RE: FEDERALLY SPONSORED RESEARCH/DEVELOPMENT

Not Applicable

BACKGROUND OF THE INVENTION

Silica is one of the major scale and fouling problems in many processes using water. Silica is difficult to deal with because it can assume many low solubility chemical forms depending on the water chemistry and metal surface temperature conditions. Below about pH 9.0, monomeric silica has limited solubility (125–180 mg/L as $SiO_2$) and tends to polymerize as these concentrations are exceeded to form insoluble (amorphous) oligomeric or colloidal silica. At higher pH, particularly above about pH 9.0, silica is soluble at increased concentrations of the monomeric silicate ion or in the multimeric forms of silica. Since conversion can be slow, all of these forms may exist at any one time. The silicate ion can react with polyvalent cations like magnesium and calcium commonly present in process waters to produce salts with very limited solubility. Thus it is common for a mixture of many forms to be present: monomeric, oligomeric and colloidal silica; magnesium silicate, calcium silicate and other silicate salts. In describing this complex system, it is common practice to refer to the mixture merely as silica or as silica and silicate. Herein these terms are used interchangeably.

To address such problem, methods of the present inventions for controlling deposition and fouling of silica or silicate salts on surfaces in a aqueous process have been derived and include: 1) inhibiting precipitation of the material from the process water; 2) dispersing precipitated material after it has formed in the bulk water; 3) maintaining an aqueous chemical environment that supports formation of increased residuals of soluble silica species; and 4) producing a non-adherent form of silica precipitants in the bulk water. The exact mechanism by which specific scale inhibition methods of the present inventions function is not well understood.

In industrial application, most scale and corrosion control methods of the present inventions used in aqueous systems typically rely on the addition of a scale and corrosion inhibitor in combination with controlled wastage of system water to prevent scale and corrosion problems. In this regard, the major scale formation potentials are contributed by the quantity of hardness (calcium and magnesium) and silica ions contributed by the source water, while the major corrosive potential results from the ionic or electrolytic strength in the system water.

Treatment methods of the present inventions to minimize corrosion have further generally relied on the addition of chemical additives that inhibit corrosion through suppression of corrosive reactions occurring at either the anode or the cathode present on the metal surface, or combinations of chemical additives that inhibit reactions at both the anode and cathode. The most commonly applied anodic inhibitors include chromate, molybdate, orthophosphate, nitrite and silicate whereas the most commonly applied cathodic inhibitors include polyphosphate, zinc, organic phosphates and calcium carbonate.

In view of toxicity and environmental concerns, the use of highly effective heavy metal corrosion inhibitors, such as chromate, have been strictly prohibited and most methods of the present inventions now rely on a balance of the scale formation and corrosive tendencies of the system water and are referred to in the art as alkaline treatment approaches. This balance, as applied in such treatment approaches, is defined by control of system water chemistry with indices such as LSI or Ryznar, and is used in conjunction with combinations of scale and corrosion inhibitor additives to inhibit scale formation and optimize corrosion protection at maximum concentration of dissolved solids in the source water. These methods of the present inventions, however, are still limited by the maximum concentration of silica and potential for silicate scale formation. Moreover, corrosion rates are also significantly higher than those available with use of heavy metals such as chromate. Along these lines, since the use of chromate and other toxic heavy metals has been restricted, as discussed above, corrosion protection has generally been limited to optimum ranges of 2 to 5 mils per year (mpy) for carbon steel when treating typical source water qualities with current corrosion control methods of the present inventions. Source waters that are high in dissolved solids or are naturally soft are even more difficult to treat, and typically have even higher corrosion rates.

In an alternative approach, a significant number of methods of the present inventions for controlling scale rely on addition of acid to treated systems to control pH and reduce scaling potentials at higher concentrations of source water chemistry. Such method allows conservation of water through modification of the concentrated source water, while maintaining balance of the scale formation and corrosive tendencies of the water. Despite such advantages, these methods of the present inventions have the drawback of being prone to greater risk of scale and/or corrosion consequences with excursions with the acid/pH control system. Moreover, there is an overall increase in corrosion potential due to the higher ionic or electrolytic strength of the water that results from addition of acid ions that are concentrated along with ions in the source water. Lower pH corrosion control methods of the present inventions further rely on significantly higher chemical additive residuals to offset corrosive tendencies, but are limited in effectiveness without the use of heavy metals. Silica concentration must still be controlled at maximum residuals by system water wastage to avoid potential silica scaling.

In a further approach, source water is pretreated to remove hardness ions in a small proportion of systems to control calcium and magnesium scale potentials. These applications, however, have still relied on control of silica residuals at previous maximum guideline levels through water wastage to prevent silica scale deposits. Corrosion protection is also less effective with softened water due to elimination of the balance of scale and corrosion tendency provided by the natural hardness in the source water.

Accordingly, there is a substantial need in the art for methods of the present inventions that are efficiently operative to inhibit corrosion and scale formation that do not rely upon the use of heavy metals, extensive acidification and/or water wastage that are known and practiced in the prior art. There is additionally a need in the art for such processes that, in addition to being efficient, are extremely cost-effective and environmentally safe. Exemplary of those processes that would likely benefit from such methods of the present inventions would include cooling water processes, cooling tower systems, evaporative coolers, cooling lakes or ponds, and closed or secondary cooling and heating loops. In each of these processes, heat is transferred to or from the water. In evaporative cooling water processes, heat is added to the water and evaporation of some of the water takes place. As the water is evaporated, the silica (or silicates) will concentrate and if the silica concentration exceeds its solubility, it can deposit to form either a vitreous coating or an adherent scale that can normally be removed only by laborious mechanical or chemical cleaning. Along these lines, at some point in the above processes, heat is extracted from the water, making any dissolved silicate less soluble and thus further likely to deposit on surfaces, thus requiring removal. Accordingly, a methods of the present invention for preventing fouling of surfaces with silica or silicates, that further allows the use of higher levels of silica/silicates for corrosion control would be exceptionally advantageous. In this respect for cooling water, an inhibition method has long been sought after that would enable silica to be used as a non-toxic and environmentally friendly corrosion inhibitor.

To address these specific concerns, the current practice in these particular processes is to limit the silica or silicate concentration in the water so that deposition from these compounds does not occur. For example in cooling water, the accepted practice is to limit the amount of silica or silicates to about 150 mg/L, expressed as $SiO_2$. Reportedly, the best technology currently available for control of silica or silicates in cooling water is either various low molecular weight polymers, various organic phosphate chemistries, and combinations thereof. Even with use of these chemical additives, however, silica is still limited to 180 mg/L in most system applications. Because in many arid areas of the U.S. and other parts of the world make-up water may contain from 50–90 mg/L silica, cooling water can only be concentrated 2 to 3 times such levels before the risk of silica or silicate deposition becomes too great. A method that would enable greater re-use or cycling of this silica-limited cooling water would be a great benefit to these areas.

SUMMARY OF THE INVENTION

The present invention specifically addresses and alleviates the above-identified deficiencies in the art. In this regard, the invention relates to methods for controlling silica and silicate fouling problems, as well as corrosion of system metallurgy (i.e. metal substrates) in aqueous systems with high concentrations of dissolved solids. More particularly, the invention is directed to the removal of hardness ions from the source water and control of specified chemistry residuals in the aqueous system to inhibit deposition of magnesium silicate and other silicate and silica scales on system surfaces, and to inhibit corrosion of system metallurgy. To that end, we have unexpectedly discovered that the difficult silica and silicate scaling problems that occur in aqueous systems when silica residuals exceed 200 mg/L as $SiO_2$ or reach as high as 4000 mg/L of silica accumulation (cycled accumulation from source water) can be controlled by initially removing hardness ions (calcium and magnesium) from the makeup source water (i.e., water fed to the aqueous system) using pretreatment methods of the present inventions known in the art, such as through the use of ion exchange resins, selective ion removal with reverse osmosis, reverse osmosis, electrochemical removal, chemical precipitation, or evaporation/distillation. Preferably, the pretreatment methods of the present invention will maintain the total hardness in the makeup water at less than 20% of the makeup silica residual (mg/L $SiO_2$), as determined from an initial assessment of the source water. In some embodiments, the total hardness ions will be maintained at less than 5% of the makeup silica residual. When source makeup water is naturally soft, with less than 10 mg/L hardness as $CaCO_3$, pretreatment removal of hardness ions may be bypassed in some systems. Thereafter, the conductivity (non-neutralized) in the aqueous system is controlled such that the same is maintained between 10,000 and 150,000 $\mu$mhos, and preferably between 20,000 to 150,000 $\mu$mhos and the pH of the source water elevated to a pH of 9.0, and preferably 9.6, or higher. With respect to the latter, the pH may be adjusted by the addition of an alkaline agent, such as sodium hydroxide, or by simply removing a portion of the aqueous system water through such well known techniques or processes as evaporation and/or distillation.

In a related application, we have unexpectedly discovered that the excessive corrosion of carbon steel, copper, copper alloys, and stainless steel alloys in aqueous systems due to high ionic strength (electrolytic potential) contributed by high dissolved solids source water or highly cycled (10,000 to 150,000 $\mu$mhos non-neutralized conductivity) systems can likewise be controlled by the methods of the present inventions of the present invention. In such context, the methods of the present invention comprises removing hardness ions (calcium and magnesium) from the makeup source water using known pretreatment methods of the present inventions, such as ion exchange resins, selective ion removal with reverse osmosis, reverse osmosis, electrochemical removal, chemical precipitation, or evaporation/distillation. The pretreatment methods of the present invention will preferably maintain the total hardness ratio in the makeup water at less than 20%, and preferably at least less than 5%, of the makeup silica residual (mg/L $SiO_2$), as determined from an initial analysis of the source water. When source makeup water is naturally soft, with less than 10 mg/L hardness as $CaCO_3$, pretreatment removal of hardness ions may be bypassed in some systems. Thereafter, the conductivity (non-neutralized) in the aqueous system is controlled such that the same is maintained between 10,000 and 150,000, and more preferably 20,000 to 150,000, $\mu$mhos. Alkalinity is then controlled as quantified by pH at 9.0 or higher, with a pH of 9.6 being more highly desired in some applications. Control of soluble silica at a minimum residual concentration of 200 mg/L as $SiO_2$ to support corrosion inhibition. With respect to the latter, the $SiO_2$ may be adjusted by the addition of a silica/silicate agent, such as sodium silicate, or by simply removing a portion of the aqueous system water through such well known techniques or processes as evaporation and/or distillation.

DETAILED DESCRIPTION OF THE INVENTION

The detailed description set forth below is intended as a description of the presently preferred embodiment of the invention, and is not intended to represent the only form in which the present invention may be constructed or utilized. The description sets forth the functions and sequences of steps for constructing and operating the invention. It is to be understood, however, that the same or equivalent functions and sequences may be accomplished by different embodiments and that they are also intended to be encompassed within the scope of the invention.

According to the present invention, there is disclosed methods for inhibiting silica and silicate scale in aqueous systems and providing exceptional metal corrosion protection that comprise the removal of hardness from the makeup source water prior to being fed into the aqueous system and thereafter controlling the aqueous system within specified water chemistry control ranges. Specifically, hardness ions (calcium and magnesium) are removed from the makeup source water using pretreatment methods known in the art, which include methods such as ion exchange resins, selective ion removal with reverse osmosis, reverse osmosis, electrochemical removal, chemical precipitation, or evaporation/distillation. The pretreatment methods will preferably maintain the total hardness ratio in the makeup water at less than 20% of the makeup silica residual (mg/L $SiO_2$). In a more highly preferred embodiment, the pretreatment methods will maintain the total hardness ions present in the makeup water at less than 5% of the makeup silica residual. As will be appreciated by those skilled in the art, the silica residual can be readily determined by utilizing known techniques, and will preferably be determined prior to the application of the methods of the present invention. Along these lines, when source makeup water is naturally soft, with less than 10 mg/L hardness as $CaCO_3$, pretreatment removal of hardness ions may be bypassed in some systems.

Conductivity (non-neutralized) is controlled in the aqueous system such that the same is between approximately 10,000 and 150,000 $\mu$mhos through control or elimination of blowdown wastage from the system. In a more highly preferred embodiment, conductivity will be maintained between approximately 20,000 and 150,000 $\mu$mhos. The higher level of ionic strength in this control range increases the solubility of multivalent metal salts that are less soluble at lower ionic strengths of other methods of the present inventions. This residual control parameter also provides indirect control of silica and alkalinity (pH) residuals contributed by concentration of naturally available silica and alkalinity in the source water or by addition of adjunct forms of these chemicals.

Aqueous system pH is maintained at 9.0 or greater as contributed by the cycled accumulation of alkalinity from the source water or through supplemental addition of an alkalinity adjunct, such as sodium hydroxide, to the system when required. The minimum pH will provide increased solubility of silica and control of silicate scale and support corrosion protection for metals. Along these lines, in certain preferred embodiments of the present invention, the pH may be raised and maintained to a level of 9.6 of higher.

Silica residuals (soluble) will be maintained in the system at levels of greater than 200 mg/L as contributed by the cycled accumulation of silica from the source water or through supplemental addition of adjunct forms of silica to the system when required. In certain applications, such levels may be maintained at levels of greater than 300 mg/L. The minimum residual of soluble silica will support corrosion inhibition for metals, and more particularly, inhibit corrosion of carbon steel to less than 0.3 mpy and less than 0.1 mpy for copper, copper alloys and stainless steel alloys present in the aqueous system.

With respect to the mechanisms by which the methods of the present inventions effectively achieve their results, excess source water silica (beyond the soluble residuals attained with specified pH control) is probably adsorbed as non-adherent precipitates that form following reaction with small amounts of metals (Ca, Mg, Fe, Al, Zn) or solids introduced by source water or scrubbed from the air by the tower system. This is the probable result of the expanded solubility of the monomeric and multimeric species of silica with the methods of the present invention that impede polymerization of excess silica until it reacts with these incrementally introduced adsorption materials to form small quantities of non-adherent precipitants. The adsorption and precipitation of high ratios of silica on small amounts of solids such as magnesium hydroxide has been demonstrated by the Freundlich isotherms, and is common experience in water treatment chemical precipitation processes. The small quantity of precipitate is removed from the circulating water through settling in the tower basin or drift losses.

Control of the lower solubility hardness scale formations and resultant nucleation sites on cooling system surfaces are controlled with the methods of the present invention disclosed herein, through pretreatment removal of the majority of the scale forming (hardness) metal ions and control of system water at the specified higher ionic strength control ranges. The higher level of ionic strength in this control range increases the solubility of scale forming metal salts. Such approach is well suited to address a further complication in controlling silica and silicate fouling brought about from the phenomena that colloidal silica tends to be more soluble as temperature is raised, while the polyvalent metal salts of the silicate ion tend to be less soluble with increasing temperature. As a result, control or minimization of polyvalent metals in the aqueous solution will prohibit formation of the insoluble salts on heat transfer surfaces, and promote increased solubility of other forms of silica at the elevated temperatures of heat transfer surfaces. The present methods thereby eliminate potential reaction of insoluble silica forms with hardness scale or metal salt deposits on system surfaces and their nucleation sites that initiate silica or silicate scale formations.

The higher residuals of soluble silica and higher pH levels maintained via the present methods of the present inventions provide highly effective polarization (corrosion barrier formation) and exceptional corrosion protection for carbon steel, copper, copper alloy and stainless steel metals (less than 0.3 mpy for mild steel, and less than 0.1 mpy copper, copper alloy, and stainless steel). Comparable corrosion rates for carbon steel in aqueous systems with existing methods of the present inventions are optimally in the range of 2 to 5 mpy. Though not fully understood, several corrosion inhibition mechanisms are believed to be contributing to the metals corrosion protection provided by the methods of the present inventions of the present invention, and the synergy of both anodic and cathodic inhibition functions may contribute to the corrosion inhibition process.

An anodic corrosion inhibitor mechanism results from increased residuals of soluble silica provided by the present methods, particularly in the multimeric form. Silicates inhibit aqueous corrosion by hydrolyzing to form negatively charged colloidal particles. These particles migrate to anodic sites and precipitate on the metal surfaces where they react with metallic ion corrosion products. The result is the formation of a self-repairing gel whose growth is self-limited through inhibition of further corrosion at the metal surface. Unlike the monomeric silica form normally found in source water that fails to provide effective corrosion inhibition, the methods of the present invention provide such beneficial effect by relying upon the presence and on control of total soluble silica residuals, with conversion of natural monomeric silica to the multimeric forms of silica at much higher levels, through application of the combined control ranges as set forth above. In this regard, the removal of most source water calcium and magnesium ions is operative to prevent reaction and adsorption of the multimeric silica forms on the metal oxide or metal salt precipitates from source water, which is believed to be an important contribution to the effectiveness of this corrosion inhibition mechanism afforded by the present invention. The resultant effective formation and control of the multimeric silica residuals with such methods of the present invention has not heretofore been available.

In addition to an anodic corrosion inhibition mechanism, a cathodic inhibition mechanism is also believed to be present. Such inhibition is caused by an increased hydroxyl ion concentration provided with the higher pH control range utilized in the practice of the present invention. In this regard, iron and steel are generally considered passive to corrosion in the pH range of 10 to 12. The elevated residual of hydroxyl ions supports equilibrium with hydroxyl ion produced during oxygen reduction at the cathode, and increases hydroxyl ion availability to react with iron to form ferrous hydroxide. As a consequence, ferrous hydroxide precipitates form at the metal surface due to very low solubility. The ferrous hydroxide will further oxidize to ferric oxide, but these iron reaction products remain insoluble at the higher pH levels attained by implementing the methods described herein to polarize or form a barrier that limits further corrosion. At the 9 to 10 pH range (as utilized in the practice of the present invention), effective hydroxyl ion passivation of metal surfaces may be aided by the pretreatment reduction of hardness ions (calcium and magnesium) in the source water that may compete with this reaction and interfere with metal surface barrier formation.

Galvanized steel and aluminum may be protected in general by the silicate corrosion inhibitor mechanism discussed herein, but protective films may be destabilized at water-air-metal interfaces. Steel, copper, copper alloy, stainless steel, fiberglass, and plastic are thus ideal aqueous system materials for application of the methods of the present inventions of the present invention.

The extensive improvement in corrosion protection provided by the methods of the present invention is not normally attainable with prior art methods when they utilize significantly higher residuals of aggressive ions (e.g., chloride and sulfate) and the accompanying greater ionic or electrolytic strength present in the aqueous system water. This may result from either use of acid for scale control and/or concentration of source water ions in the aqueous system. As is known, corrosion rates generally increase proportionately with increasing ionic strength. Accordingly, through the ability to protect system metals exposed to this increased electrolytic corrosion potential, opportunity for water conservation and environmental benefits that result with elimination of system discharge used with previous methods to reduce corrosion or scaling problems in aqueous systems can be readily realized through the practice of the methods disclosed herein.

Still further, the methods of the present inventions of the present invention can advantageously provide gradual removal of hardness scale deposits from metal surfaces. This benefit is accomplished through both pretreatment removal of the majority of the scale forming (hardness) metal ions and control of system water at the specified higher ionic strength control ranges. Solubility of hardness salts is increased by the higher ionic strength (conductivity) provided by the present methods of the present invention, which has been determined with high solids water such as seawater, and may contribute to the increased solubility of deposits present within the aqueous environment so treated. Studies conducted with hardness scale coated metal coupons in treated systems demonstrated a significant deposit removal rate for $CaCO_3$ scale films in ten days. Control of source water hardness at lower specified residuals will probably be required to achieve optimum rate of hardness scale removal.

Furthermore, the present methods advantageously prohibits microorganism propagation due to the higher pH and dissolved solids levels that are attained. Biological fouling potentials are thus significantly reduced. In this regard, the methods of the present inventions disclosed herein create a chemical environment that inhibits many microbiological species that propagate at the pH and dissolved solids chemistry ranges used with previous treatment approaches. The reduction in aqueous system discharge also permits use of residual biocides at more effective and economical dosages that impede development of problem concentrations of any microbiological species that are resilient in the aqueous environment generated through the practice of the methods of the present inventions disclosed herein.

A still further advantage of the methods of the present invention include the ability of the same to provide a lower freeze temperature in the aqueous system, comparable to ocean water, and avert potential mechanical damage from freezing and/or operational restrictions for systems located in freeze temperature climates.

Additional modifications and improvements of the present invention may also be apparent to those of ordinary skill in the art. Thus, the particular combination of parts and steps described and illustrated herein is intended to represent only certain embodiments of the present invention, and is not intended to serve as limitations of alternative devices and methods of the present inventions within the spirit and scope of the invention. For example, since the methods of the present invention provides both effective silicate scale control and corrosion inhibition when using high silica or high dissolved solids source waters, extensive variation in source water quality can be tolerated. These source waters might otherwise be unacceptable and uneconomical for use in such aqueous systems. In addition, such modifications may include, for example, using other conventional water treatment chemicals along with the methods of the present invention, and could include other scale inhibitors, such as for example phosphonates, to control scales other than silica, corrosion inhibitors, biocides, dispersants, defoamers and the like. Accordingly, the present invention should be construed as broadly as possible.

As an illustration, below there are provided non-restrictive examples of an aqueous water system that has been treated with methods conforming to the present invention.

Examples of Silicate Scale Inhibitor Method

The following analytical tests were performed on a cooling tower system treated with the methods of the present invention to demonstrate the efficacy of the present invention for controlling the solubility of silica and silicate species, and preventing scale deposition of these species. Two samples of each of the following: 1) varying source water; 2) the resultant treated system water; and 3) tower sump insoluble accumulations, for a total of six samples were analyzed from different operating time frames.

Although the exact mechanism of action of the process is not completely understood, the methods of the present invention minimize the turbidity of the treated water, which is considered a demonstration of an effective silica and silicate scale inhibitor. Methods that produce treated water of less than eight nephelometric turbidity units (NTU) are considered improvements over the current available technology. Turbidity measurements (Table 1) performed on samples taken from the cooling systems, before and after filtration through a 0.45-micron filter, illustrate effective silicate inhibition in the treated water. The turbidity levels are well below typical cooling tower systems, in particular at such high concentrations (80 COC), and indicate the methods of the present invention provide controlled non-adherent precipitation of excess silica and other insoluble materials entering the system. Clean heat exchanger surfaces have confirmed that the method silica precipitation is non-adherent. The precipitated silica forms are contained in the cooling tower sump. However, the volume of precipitant and scrubbed accumulations in the tower sump were not appreciably greater than previous treatment methods due to reduction of insoluble multivalent metal salt precipitates by pretreatment removal.

TABLE 1

Tower Water Turbidity Analyses

| Sample No. 1: (Turbidity, NTU) | Neat, 4 NTU; Filtered, 2 NTU |
|---|---|
| Sample No. 2: (Turbidity, NTU) | Neat, 3 NTU |

The cooling tower and makeup water analytical tests performed in Table 2 and Table 3 illustrate the effectiveness of the methods of the present invention in maintaining higher levels of soluble silica in the cooling tower system when parameters are controlled within the specified pH and low makeup hardness ranges. Soluble silica residuals are present at 306 and 382 mg/L in these tower samples at the respective 9.6 and 10.0 pH levels. The lower cycles of concentration (COC) for silica in these tower samples, as compared to the higher cycled residuals for soluble chemistries (chloride, alkalinity, conductivity), indicate that excess silica is precipitating as non-adherent material, and accumulating in the tower basin. This is confirmed by the increased ratio of silica forms found in tower basin deposit analyses. System metal and heat exchange surfaces were free of silica or other scale deposits.

TABLE 2

Cooling Tower Sample No. 1/Makeup/Residual Ratios (COC)

| SAMPLE/TESTS | Tower (*adjunct) | Makeup (soft) | COC |
|---|---|---|---|
| Conductivity, $\mu$mhos (Un-neutralized) | 33,950 | 412 | 82.4 |
| pH | 10.01 | 8.23 | NA |
| Turbidity, NTUs | | | |
| Neat | 3 | 0.08 | NA |
| Filtered (0.45$\mu$) | — | — | — |
| Copper, mg/L Cu | ND | ND | NA |
| Zinc, mg/L | ND | ND | NA |
| Silica, mg/L $SiO_2$ | 382 | 9.5 | 40.2 |
| Calcium, mg/L $CaCO_3$ | 16.0 | 0.20 | NA |
| Magnesium, mg/L $CaCO_3$ | 3.33 | 0.05 | NA |
| Iron, mg/L Fe | ND | ND | NA |
| Aluminum, mg/L Al | ND | ND | NA |
| Phosphate, mg/L $PO_4$ | ND | ND | NA |
| Chloride, mg/L | 6040 | 80 | 75.5 |
| Tot. Alkalinity, mg/L | 13200 | 156 | 84.6 |

ND = Not Detectable; NA = Not Applicable; COC = Cycles of Concentration

TABLE 3

Cooling Tower Sample No. 2/Makeup/Residual Ratios (COC)

| SAMPLE/TESTS | Tower (no adjunct) | Makeup (soft) | COC |
|---|---|---|---|
| Conductivity, $\mu$mhos (Un-neutralized) | 66,700 | 829 | 80 |
| pH | 9.61 | 7.5 | NA |
| Turbidity, NTUs | | | |
| Neat | 4 | 0.08 | NA |
| Filtered (0.45$\mu$) | 2 | — | — |
| Zinc, mg/L | ND | ND | NA |
| Silica, mg/L $SiO_2$ | 306.4 | 11 | 28 |
| Calcium, mg/L $CaCO_3$ | 21.5 | 0.20 | NA |
| Magnesium, mg/L $CaCO_3$ | 0.65 | 0.05 | NA |
| Iron, mg/L Fe | ND | ND | NA |
| Aluminum, mg/L Al | ND | ND | NA |
| Phosphate, mg/L $PO_4$ | ND | ND | NA |

ND = Not Detectable; NA = Not Applicable; COC = Cycles of Concentration

Microscopic and chemical analysis of deposit samples from accumulated residue in the tower basin of a system treated by present methodology are shown in Exhibit 1 and Exhibit 2. Both analyses illustrate the significant ratio of silica materials in the deposit. The major proportion of this silica is the probable result of silica adsorption or reaction with insoluble precipitates of multivalent metals as they concentrated in the tower water. Visual inspections of heat transfer equipment in the system treated by this method have confirmed that it has remained free of silica and other scale deposits. System heat transfer efficiencies were also maintained at minimum fouling factor levels.

Exhibit 1
MICROSCOPICAL ANALYSIS -
POLARIZED LIGHT MICROSCOPY
DEPOSIT DESIGNATION: Cooling Tower Basin Deposit

| % ESTIMATED | CONSTITUENTS |
|---|---|
| >30 | Amorphous silica, including assorted diatoms, probably including amorphous magnesium silicate; calcium carbonate (calcite) |
| 1–2 | Assorted clay material including feldspar; hydrated iron oxide; carbonaceous material |
| <1 | Silicon dioxide (quartz); assorted plant fibers; unidentified material including possibly aluminum oxide (corundum) |

Exhibit 2
CHEMICAL ANALYSIS - DRIED SAMPLE
DEPOSIT DESIGNATION: Cooling Tower Basin Deposit

| % ESTIMATED | CONSTITUENTS |
|---|---|
| 12.1 | CaO |
| 8.5 | MgO |
| 5.2 | $Fe_3O_4$ |
| 3.7 | $Fe_2O_3$ |
| <0.5 | $Al_2O_3$ |

-continued

Exhibit 2
CHEMICAL ANALYSIS - DRIED SAMPLE
DEPOSIT DESIGNATION: Cooling Tower Basin Deposit

| % ESTIMATED | CONSTITUENTS |
|---|---|
| 13.2 | Carbonate, $CO_2$ |
| 51.1 | SiO2 |
| 5.7 | Loss on Ignition |

Most probable combinations: Silica ~54%, Calcium Carbonate ~32%, Oxides of Iron ~9%, Mg and Al Oxides ~5%.

Examples of Corrosion Inhibition Methods of the Present Invention

The data in Table 4 illustrate the effectiveness of the methods of the present invention in inhibiting corrosion for carbon steel and copper metals evaluated by weight loss coupons in the system. No pitting was observed on coupon surfaces. Equipment inspections and exchanger tube surface testing have confirmed excellent corrosion protection. Comparable corrosion rates for carbon steel in this water quality with existing methods of the present inventions are optimally in the range of 2 to 5 mpy.

TABLE 4

CORROSION TEST DATA

| Specimen Type | Carbon Steel | Copper |
|---|---|---|
| Test location | Tower Loop | Tower loop |
| Exposure period | 62 Days | 62 Days |
| Corrosion Rate (mpy) | 0.3 | <0.1 |

Examples of Scale Deposit Removal

The data in Table 5 illustrate hardness ($CaCO_3$) scale removal from metal surfaces in a tower system treated with the methods of the present invention through coupon weight loss reduction. Standard metal coupons that were scaled with $CaCO_3$ film were weighed before and after ten days of exposure and the visible removal of most of the scale thickness. The demonstrated $CaCO_3$ weight loss rate will provide gradual removal of hardness scale deposits that have occurred in a system prior to method treatment.

TABLE 5

SCALE DEPOSIT REMOVAL TEST DATA

| Specimen Type | Carbon Steel | Copper |
|---|---|---|
| Test location | Tower Loop | Tower loop |
| Exposure period | 10 Days | 10 Days |
| Scale Removal (mpy) | 8.3 | 8.1 |

What is claimed is:

1. A method for controlling silica or silicate scale formation in an aqueous cooling water system with silica contributed by source water, comprising the steps:

a) removing hardness ions from said source water fed to said system;

b) controlling the conductivity of the aqueous system water such that said aqueous system water possesses a conductivity from approximately 10,000 to 150,000 μmhos, wherein said aqueous system water contains soluble $SiO_2$ in excess of 200 mg/L;

c) elevating and maintaining the pH of said aqueous system water such that said aqueous system water possesses a pH of approximately 9.0 or greater; and d) providing a metallic heat transfer surface in said system and cyclically contacting said aqueous system water thereabout, wherein said pH increases the solubility of said silica and controls silica or silicate scale formation on said metallic heat transfer surface.

2. The method of claim 1 wherein in step a), said hardness ions comprise ions of calcium and magnesium.

3. The method of claim 1 wherein said aqueous system water contains soluble $SiO_2$ in excess of 300 mg/L.

4. The methods of the present invention of claim 1 wherein in step a), said hardness ions are removed in amounts equal to or less than approximately 20% of the $SiO_2$ present within said source water.

5. The methods of the present invention of claim 1 wherein in step a), said hardness ions are removed in amounts equal to or less than approximately 5% of the $SiO_2$ present within said source water.

6. The method of claim 1 wherein in step c), said pH is maintained at 9.6 or higher.

7. The method of claim 1 wherein in step a), said hardness ions are removed via a method selected from the group consisting of ion exchange, selective ion removal with reverse osmosis, reverse osmosis, electro chemical removal, chemical precipitation, evaporation and distillation.

8. The method of claim 1 wherein in step c), said pH is increased by adding an alkali agent.

9. The method of claim 8 wherein said alkali agent comprises sodium hydroxide.

10. The method of claim 1 wherein in step c), said pH is elevated by evaporating a portion of said aqueous system water.

11. The method of claim 1 wherein in step c), said pH is elevated by distilling a portion of said aqueous system water.

12. The method of claim 1 wherein in step c), said source water comprises water utilized for cooling processes, water utilized for cooling tower systems, water utilized for evaporative cooling, water utilized for cooling lakes or ponds, water utilized for enclosed or secondary cooling and heating loops.

13. The method of claim 1 wherein prior to step a), said method comprises the step:

a) analyzing said source water to determine the concentration of $SiO_2$ present therein.

14. The method of claim 1 wherein in step b), said conductivity of said aqueous system water is controlled such that said aqueous system water possesses a conductivity from approximately 20,000 to 150,000 μmhos.

15. The method of claim 1, wherein said source water contains silica in an amount of 4000 mg/L or less.

* * * * *